United States Patent
Äijä et al.

(10) Patent No.: US 7,137,026 B2
(45) Date of Patent: Nov. 14, 2006

(54) CRASH RECOVERY SYSTEM

(75) Inventors: Gunnar Äijä, Rimforsa (SE); Morteza Kalhour, Linköping (SE)

(73) Assignee: Nokia Corporation, Espoo (FI)

( * ) Notice: Subject to any disclaimer, the term of this patent is extended or adjusted under 35 U.S.C. 154(b) by 622 days.

(21) Appl. No.: 09/970,499

(22) Filed: Oct. 4, 2001

(65) Prior Publication Data
US 2003/0070110 A1    Apr. 10, 2003

(51) Int. Cl.
*G06F 11/14*    (2006.01)
(52) U.S. Cl. .................. 714/4; 714/6; 714/23; 714/38; 713/2
(58) Field of Classification Search .............. 714/4, 714/6, 23, 38; 713/2
See application file for complete search history.

(56) References Cited

U.S. PATENT DOCUMENTS

| | | | |
|---|---|---|---|
| 5,157,663 A | 10/1992 | Major et al. | 371/9.1 |
| 5,586,249 A | 12/1996 | Suzuki et al. | |
| 5,835,761 A | 11/1998 | Ishii et al. | |
| 5,974,547 A * | 10/1999 | Klimenko | 713/2 |
| 6,175,904 B1 | 1/2001 | Gunerson | 711/162 |
| 6,209,089 B1 * | 3/2001 | Selitrennikoff et al. | 714/6 |
| 6,259,442 B1 | 7/2001 | Britt, Jr. et al. | 345/327 |
| 6,393,585 B1 | 5/2002 | Houha et al. | 714/23 |
| 6,532,537 B1 * | 3/2003 | Chen et al. | 713/2 |
| 2002/0053044 A1 | 5/2002 | Gold et al. | 714/38 |
| 2003/0065913 A1 * | 4/2003 | Cepulis et al. | 713/1 |

FOREIGN PATENT DOCUMENTS

WO    WO 95/22794    8/1995

* cited by examiner

*Primary Examiner*—Robert Beausoliel
*Assistant Examiner*—Joseph D Manoskey
(74) *Attorney, Agent, or Firm*—Cohen, Pontani, Lieberman & Pavane

(57) ABSTRACT

A set top box for a television includes a hard drive, a random access memory, and a non-volatile memory. To maintain functionality of the device after a crash of the hard drive, the non-volatile memory includes an executable program for downloading a secondary operating system from a remote server or other secondary storage during a startup when the primary operating system in the hard drive is not accessible. The secondary operating system is stored in the random access memory and is a functional subset of the primary operating system to allow the use of the primary functionality of the set top box until the hard disk drive is repaired or replaced.

45 Claims, 3 Drawing Sheets

CRASH RECOVERY SYSTEM

BACKGROUND OF THE INVENTION

1. Field of the Invention

The present invention relates to a method and system for starting up a computer device having a defective permanent memory device, such as a hard drive.

2. Description of the Related Art

Computer systems such as personal computers and television set top boxes which manage television functions proceed through a start-up procedure or boot in which the operating system and other basic software are loaded. The operating system and hardware are typically loaded from a permanent memory such as a hard disk drive of the computer system during the startup procedure. If an error occurs in the permanent memory which prevents the operating system from loading, the computer system is rendered inoperable.

A known prior art system for recovering from software problems that cause system failures is disclosed in PCT Patent Publication No. WO 95/22794. In that prior art system, a secondary startup volume is stored in a permanent memory device of the system and is used when the primary startup software fails. The secondary startup volume is arranged on a separate part of the permanent memory device of the system, i.e., on the same hard disk drive that holds the primary starting system. Accordingly, if there is a problem with the hard disk drive itself, neither the primary nor the secondary startup volume can be used.

Another system is disclosed in U.S. Pat. No. 6,259,442 in which software is downloaded from a remote server to a client device. According to this reference, the most current version of software can be downloaded to a client device from a remote server, thereby allowing correction of defects in the original software on the client device. However, this disclosure fails to address the problem that arises when the permanent storage device, i.e., the hard disk drive, fails thereby making it impossible for the client device to even contact the remote server so that replacement software can be downloaded.

SUMMARY OF THE INVENTION

The object of the present invention is to provide a method and system for starting up a computer system when a permanent memory device of the computer system is inoperable.

According to an embodiment of the present invention, a computer device such as a set top box for a television includes a central processing unit, a non-volatile read only memory (ROM) including a software module for initializing the computer device at startup, a random access memory (RAM), i.e., an internal memory rewritable which is readily accessible by the CPU, and a permanent memory device including software for an operating system of the device which is downloaded at startup. The software module of the non-volatile memory of the ROM has enough information to determine when a crash of the permanent memory device has occurred, i.e., when the permanent memory device is inoperative. Furthermore, the software module of the ROM initiates a connection to a remote server for downloading a secondary operating system to the RAM if a crash or inoperability of the permanent memory device is detected. Once the secondary operating system is saved in the RAM, the computer device starts up using the stored secondary operating system.

Since the RAM typically has a relatively small amount of memory as compared to the permanent memory device, the downloaded secondary operating system may include only those parts of an operating system that are necessary to perform the primary function of the computer device. If the RAM is large enough, one or more ancillary functions may optionally be included in the secondary operating system.

The computer device maintains the power supply to the RAM when the computer device is in a standby mode (i.e., a user off mode in which power dissipation is low). Accordingly, the secondary operating system stored in the RAM is not lost and when a warm start (i.e., a transition from standby mode to an active mode) is initiated, the secondary operating system stored in the RAM can used to boot the computer. The secondary operating system therefore does not have to be downloaded repeatedly each time the device is turned on (i.e., transitioned to the active mode), and the user can repair the permanent memory when it is convenient to do so without losing the primary functionality of the computer device.

Instead of being stored at a remote server, the secondary operating system may alternatively be stored on a separate locally available memory device such as a floppy disk or electronic memory card. In this modified embodiment, the user must insert or connect the disk or card to the computer device during startup if the permanent memory is inoperable. As a further alternative, the computer device may include a secondary memory on which the secondary operating system is stored so as to be available if and when the permanent memory is rendered inoperable.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PRESENTLY PREFERRED EMBODIMENTS

Figure 1:
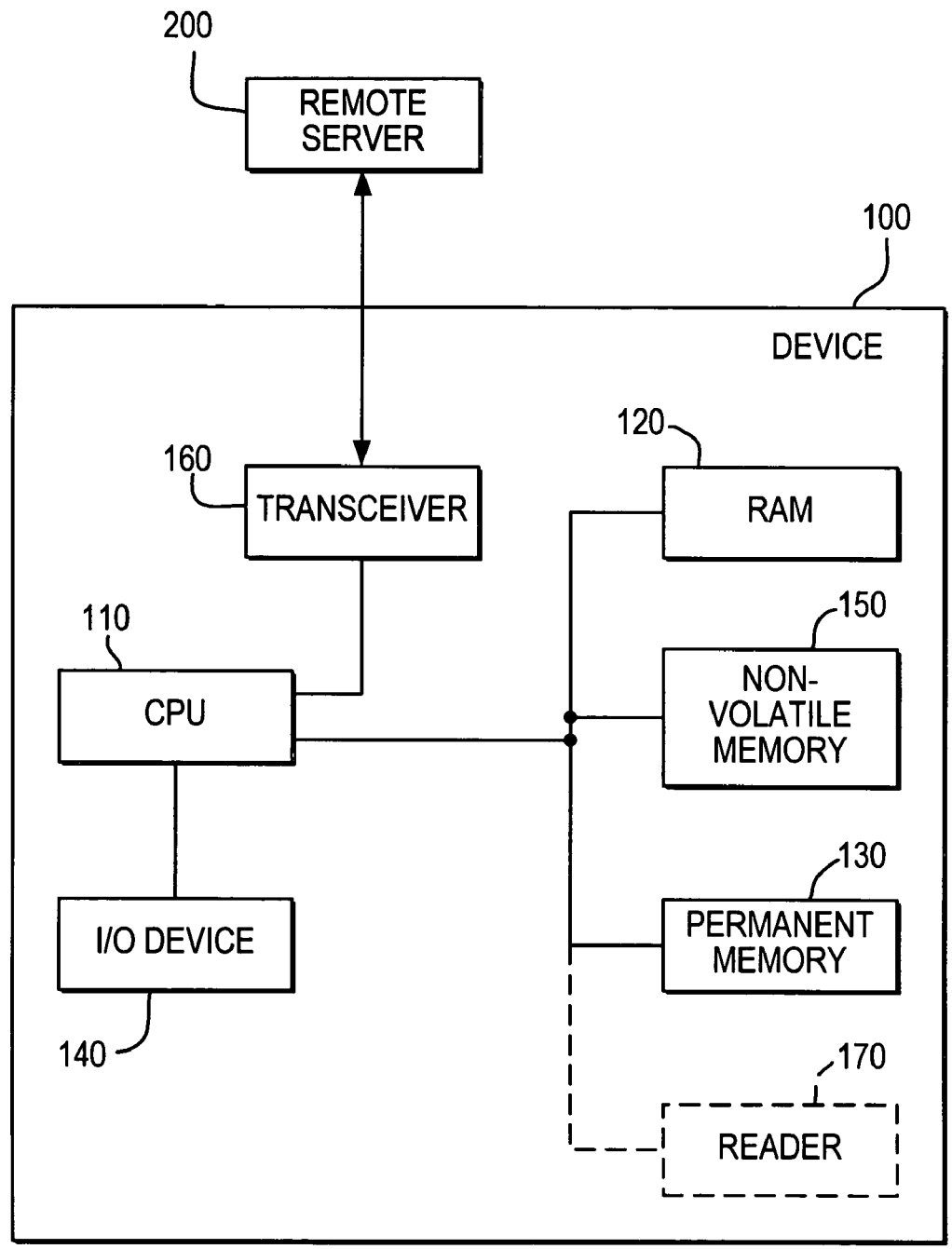
FIG. 1 is a block diagram of a device that includes a system for starting a computer device with an inoperative hard drive according to the present invention.

FIG. 1 is a block diagram of an illustrative computer device 100 which may by way of example comprise a personal computer, a laptop computer, a handheld computer, a set top box for a television, or any device which starts up by loading operating system software from a permanent memory device, i.e. a hard disk drive. A set top box is a specialized computer that allows access to the Internet or other content using a television set as a display. Furthermore, the set top box may additionally or alternatively be used for decoding digital television broadcasts and/or providing other television viewing functions such as recording of broadcasts.

The computer device 100 includes a central processing unit (CPU) 110 connected to an input/output (I/O) device 140, a primary memory device comprising a permanent memory 130, a Random Access Memory (RAM) 120, and a non-volatile memory 150. The I/O device 140 may comprise a keyboard, a mouse, a remote control unit and/or any other device which may be used by a user to input commands to the computer device 100. The non-volatile memory 150 is a Read Only Memory (ROM) which includes or contains the program that initially boots or starts up the device 100. The non-volatile memory 150 may comprise a flash memory. The RAM 120 is the main memory of the device, i.e., the rewritable memory that is internal to the device and which is readily accessible by the CPU 110. The boot process may be initiated from a cold start or a warm start, e.g., start up from a low power stand-by mode. A cold start occurs when the device 100 is first powered up, i.e., turned on from the off condition, and a warm start occurs when a computer that is already powered up is reset to load or reload the operating system. During the boot process, a software module in the ROM 150 instructs the CPU 110 to load the operating system of the device which is stored in the permanent memory 130, such as a hard disk drive. Once the operating system has been loaded, the device is booted (to initiate operation of the operating system) and the functions of the operating system can then be performed by the device 100. The present invention relates to starting of the computer device 100 when the permanent memory 130 is inoperable such that the operating system stored thereon cannot properly be loaded into the RAM 120. The failure of the permanent memory 130 may, for example, be caused by a hardware malfunctioning, a computer lockup or a virus.

Figure 2:
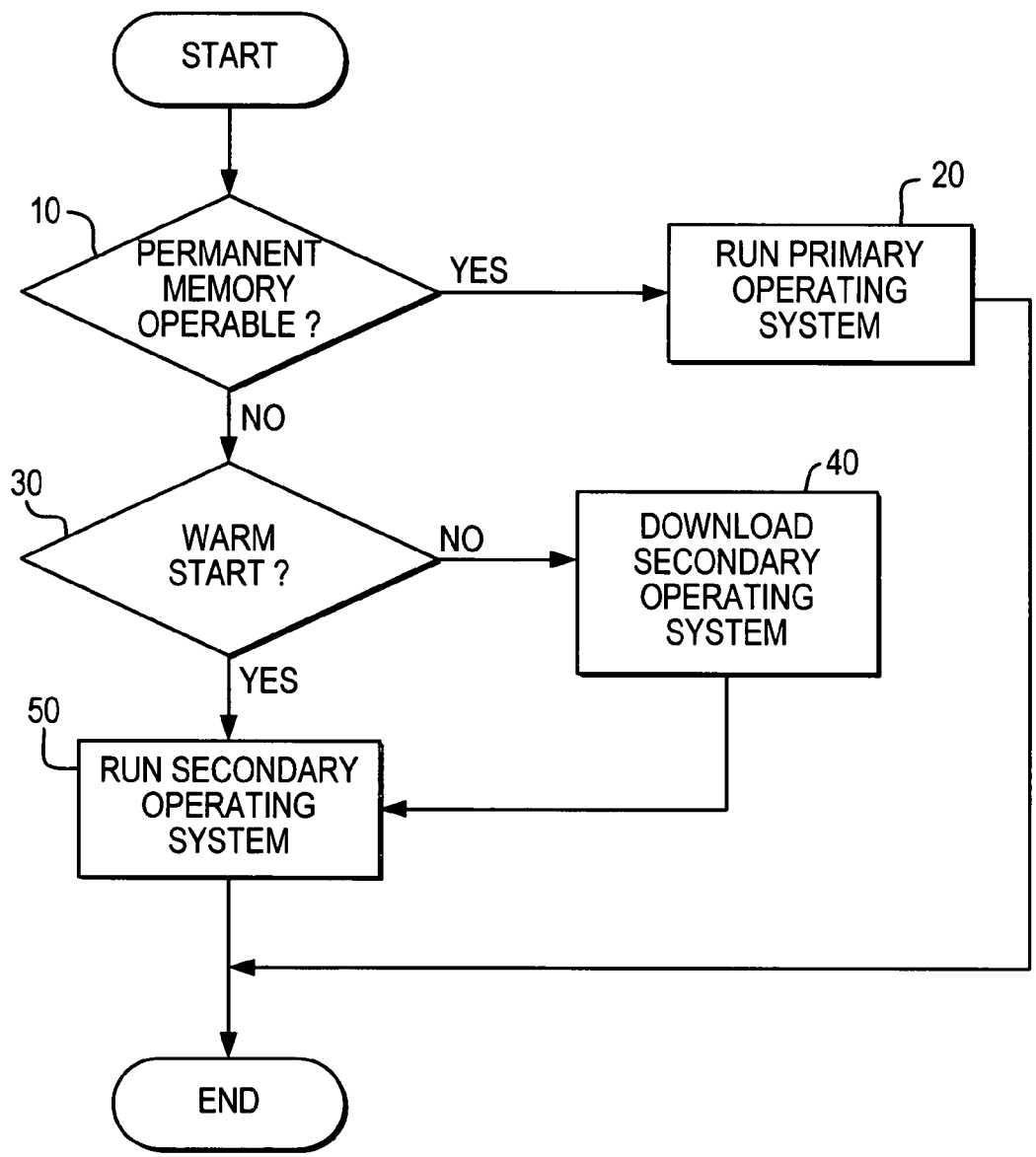
FIG. 2 is a flow chart of a method for starting a computer device having an inoperative hard drive according to the present invention.

FIG. 2 depicts a flow chart of a method for starting up a computer having an inoperative permanent memory 130 according to an embodiment of the present invention in which the device 100 is a set top box used for controlling a television. Alternatively, the device 100 could be any computer device that has a central processing unit, ROM, RAM, and an operating system saved or stored in a permanent memory.

During a startup procedure in accordance with an embodiment of the present invention, the CPU 110 first accesses the software module in the non-volatile memory 150 and then determines (using the software module) whether the permanent memory 130 is functioning properly, step 10. The determination performed in step 10 may include sending a command to the permanent memory 130 to download the operating system and awaiting receipt of a proper response, i.e., correct status, from the permanent memory 130. Alternatively, the CPU 110 may determine a failure of the permanent memory by receipt of a failed signature check of the permanent memory 130. The computer device 100 typically has a watchdog timer that resets the device 100 when the startup fails. A crash or failure of the permanent memory 130 may also be detected if the reset of the computer device by the watchdog timer is repeated more than a predefined number of times, e.g., more than 5 times.

If the permanent memory 130 is functioning properly, at least a portion of the primary operating system which is stored in the permanent memory 130 is downloaded to the RAM 120 and the primary operating system is started, step 20. Step 20 is performed whether the startup is a cold start (a start when the device is switched on from the off condition) or a warm start (i.e., a reset).

If it is determined that the permanent memory 130 is not functioning properly in step 10, the CPU 110 then determines whether the current startup procedure is a warm start or a cold start, step 30. This can be determined by examining a bit in the volatile memory, i.e., the RAM 120, the value of which is reset after a cold start. If it is determined that the startup is a cold start (which will be the case when a crash of the permanent memory 130 is first detected), then a secondary operating system is downloaded from a secondary memory device such as a remote server 200 and stored in the RAM 120, step 40. The part of the RAM 120 in which the secondary operating system is saved is looked upon by the CPU 110 as a disk drive (i.e., a virtual disk drive). The device 100 may then continue the startup process using the secondary operating system stored in RAM 120. The secondary operating system may include only those parts of the operating system that are critical to the primary functionality of the device 100. In the illustrative embodiment, the device 100 includes a set top box for a television; accordingly, only those parts of the operating system that are critical to television viewing are included in the secondary operating system. Preferably, the secondary operating system uses the same graphical user interface as the primary operating system. Other functions such as games and additional features and applications that are not required for providing or supporting the primary functionality of the device 100 are not included in the secondary operating system. Of course, if memory or storage space permits, one or more of such ancillary features or functions may also be included in the secondary operating system as described in more detail below.

During step 40, the CPU 110 is connected to the remote server 200 via a transceiver 160. Once the CPU 110 is connected to the remote server 200, the download of the secondary operating system from the remote server 200 is effected via the transceiver 160. In a preferred embodiment, the transceiver 160 is a dial-up modem. Of course, the transceiver may alternatively include other devices capable of IP or other data-based data transmission such as a cable television modem, an internet connection, an antenna or a satellite receiver.

The remote server 200 may be able to detect the type of device 100 and provide a secondary operating system best suited for that particular device 100. In this embodiment, when the device 100 connects to the remote server 200, a signal may be transmitted to the remote server 200 to indicate the characteristics of the device 100 such as the manufacturer and model number or more specific characteristics of the RAM 120. For example, the remote server may determine or be provided with the available memory capacity of RAM 120 available in the device 100 which could be used to determine the number of ancillary functions that should be included in the secondary operating system download. Furthermore, the remote server 200 may be able to detect or be provided with a user profile for the device 100. The user profile is user-specific data that defines the user's working environment such as display settings, application settings, and type of network connection, i.e., the user profile defines what the user sees and what files, applications, and directories the user has access to. Furthermore, the user profile may contain a history of the various functions of the computer device accessed by a user. The user profile may also be used to determine what functions are to be included in the secondary operating system download. For example, if the user profile indicates that an ancillary function such as monitoring a second program while watching a primary program is often used, that particular ancillary function may be included in the secondary operating system in addition to the parts that support the main functionality of the device 100 if the RAM 120 is large enough to accommodate that additional function. Of course, the user profile may also include a user favorites list that may also be saved as part of the secondary operating system. The user favorites list is, for example, a list of programs or functions that the user normally accesses.

After the secondary operating system has been downloaded to the RAM 120, the device 100 can be warm started without again downloading the secondary operating system again. Television set top boxes often remain in a standby mode even when the television is turned off. According to the present invention, power to the RAM remains on in the Standby mode. Therefore, the secondary system need only be downloaded once for these devices and the user can repair the permanent memory 130 when it is convenient to do so without losing the main functionality of the device 100.

Figure 3:
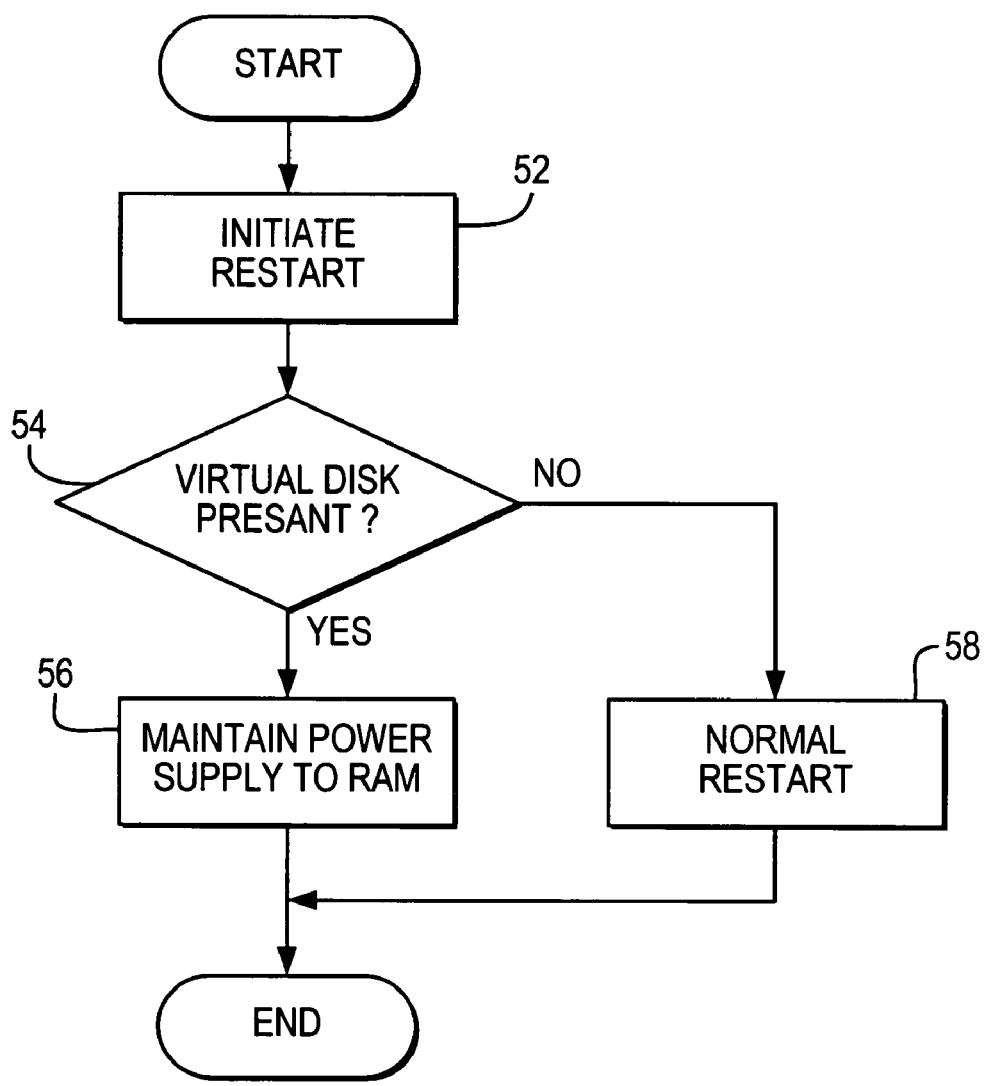
FIG. 3 is a flow chart of a warm start method for a computer device according to the present invention.

Since the device 100 may be warm started without repeating the downloading of the secondary operating system, the device 100 must maintain the virtual disk portion of the RAM 120 during a warm start. Accordingly, the device 100 must be configured so that at least the virtual disk portion of the RAM 120 that includes the secondary operating system is not altered during a warm start in step 50 using the secondary operating system. Accordingly, step 50 includes the substeps shown in the flow chart of FIG. 3 for maintaining the virtual disk in the RAM 120 during a restart if the secondary operating system is to be used. In step 52 the user inputs the restart command to the CPU 110 via the I/O device 140. The CPU 110 then determines whether the virtual disk in the RAM should be maintained, step 54. This may be accomplished by determining whether the virtual disk exists in RAM 120 or merely verifying a setting in the volatile memory that would be reset if the virtual disk was not present. Thus, for example, one bit of the RAM 120 may be used as a flag, which is set during step 40, to determine whether the virtual disk exists. If the virtual disk exists, then the power to the RAM 120 is maintained during the warm start, step 56, so that the contents of the RAM 120 are not lost during the warm start. If the virtual disk is not present, a normal start may be performed in which the RAM 120 is lost, step 58. Alternatively, the device 100 may be designed so that power to the RAM 120 is always maintained during a warm start.

In an alternative embodiment, the secondary operating system may be downloaded from an external, locally available memory medium such as a floppy disk or other memory device such as an electronic memory card and saved to the RAM 120. In this embodiment, the device 100 includes a memory reader 170 (shown in dotted lines in FIG. 1) for reading the memory medium. In this embodiment, the step 40 may include prompting the user of the device 100 to insert a disk or card on which the secondary operating system is arranged and saving the secondary operating system to the RAM 120. The reader 170 may alternatively comprise a separate memory device, such as a non-volatile ROM, on which the secondary operating system is permanently stored.

The primary operating system and secondary operating system may be a windows-based operating system, an apple-based operating system, a Linux-based operating system, or any other type of operating system which may be applicable to the computer device 100.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for starting a computer device, comprising the steps of:
   (a) initiating a startup of the computer device;
   (b) determining whether an operating error exists in a primary memory device of the computer device which prevents the running of an operating system of the computer device saved on the primary memory device;
   (c) determining, if it is determined in said step (b) that the error exists, whether the startup initiated in said step (a) is a warm start or cold start;
   (d) downloading a secondary operating system from a secondary memory located in a remote server and storing the secondary operating system in a random access memory of the computer device if it is determined that the startup is a cold start in said step (c), the random access memory being separate from the primary memory device, wherein the remote server detects a characteristic of the computer device, selects a secondary operating system appropriate for the device based on the detected characteristic, and transmits the secondary operating system to the computer device for storage in the random access memory; and
   (e) running the secondary operating system on the computer device after completing the downloading of said step (d).

2. The method of claim 1, wherein said step (d) further comprises connecting the computer device to the remote server via a transceiver.

3. The method of claim 2, wherein the transceiver comprises one of a dial-up modem, a cable modem, an internet connection, an antenna, and a satellite signal transceiver.

4. The method of claim 1, wherein the characteristic comprises one of a type of the computer device and a memory capacity of the random access memory of the computer device.

5. The method of claim 1, wherein said step of selecting a secondary operating system appropriate for the device includes selecting parts of the operating system that support a primary functionality of the computer device and selecting parts of the operating system that support an ancillary function of the computer device based on the characteristic.

6. The method of claim 1, wherein said step (d) further comprises the step of determining, by the remote server, a user profile including user-specific settings for the computer device, and wherein said step of selecting a secondary operating system appropriate for the device is based on the characteristic and the user profile.

7. The method of claim 6, wherein said step of selecting a secondary operating system appropriate for the device includes selecting parts of an operating system that support a primary functionality of the computer device and selecting parts of the operating system that support an ancillary function based on the characteristic and the user profile.

8. The method of claim 1, wherein said step (b) comprises one of determining a failure to receive a correct status signal from the primary memory device, determining a failure of a signature check on the primary memory device, and determining an occurrence of at least two repeated resets of a watchdog timer during the startup of said step (a).

9. The method of claim 1, wherein said step (c) comprises determining whether the startup is a cold start by detecting whether a cold start indicating bit in the random access memory is reset.

10. The method of claim 1, further comprising the step of defining a portion of the random access memory in which the secondary operating system is stored in said step (d) as a virtual disk.

11. The method of claim 1, wherein the secondary memory comprises an external memory medium comprising one of a floppy disk and an electronic memory storage device.

12. The method of claim 1, wherein the secondary operating system comprises only the parts of the operating system that are necessary for a primary functionality of the computer device.

13. A method of for starting a computer device, comprising the steps of:
  (a) initiating a startup of the computer device;
  (b) determining whether an operating error exists in a primary memory device of the computer device which prevents the running of an operating system of the computer device saved on the primary memory device;
  (c) determining, if it is determined in said step (b) that the error exists, whether the startup initiated in said step (a) is a warm start or cold start;
  (d) downloading a secondary operating system from a secondary memory located in a remote server and storing the secondary operating system in a random access memory of the computer device if it is determined that the startup is a cold start in said step (c), the random access memory being separate from the primary memory device, wherein the remote server detects a user profile including user-specific settings for the computer device, selects a secondary operating system corresponding to the user profile and transmits the secondary operating system to the device for storage in the random access memory; and
  (e) running the secondary operating system on the computer device after completing the downloading of said step (d).

14. The method of claim 13, wherein said step of selecting a secondary operating system includes selecting parts of the operating system that support a primary functionality of the computer device and selecting parts of the operating system that support an ancillary function of the computer device based on the user profile.

15. A method of for starting a computer device, comprising the steps of:
  (a) initiating a startup of the computer device;
  (b) determining whether an operating error exists in a primary memory device of the computer device which prevents the running of an operating system of the computer device saved on the primary memory device;
  (c) determining, if it is determined in said step (b) that the error exists, whether the startup initiated in said step (a) is a warm start or cold start;
  (d) downloading a secondary operating system from a secondary memory and storing the secondary operating system in a random access memory of the computer device if it is determined that the startup is a cold start in said step (c), the random access memory being separate from the primary memory device;
  (d1) initiating a warm start of the computer device after said step (d), wherein a supply of power to the random access memory is maintained during a standby mode so that the secondary operating system remains stored on the random access memory for use during a warm start; and
  (e) running the secondary operating system on the computer device after completing the downloading of said step (d).

16. The method of claim 15, wherein said secondary memory in said step (d) is located in a remote server.

17. The method of claim 15, wherein the secondary memory is located in the computer device.

18. A computer device having a system for recovering from a primary memory error that prevents proper start up of a primary operating system, said computer device comprising:
  a central processing unit;
  a primary memory device connected to said central processing unit and containing a stored operating system for said computer device;
  a random access memory connected to said central processing unit and separate from said primary memory device;
  a non-volatile memory connected to said central processing unit and storing a software module executable for initializing said computer device during a startup of said computer device and for determining whether said primary memory device contains an operating error that prevents said primary memory device from running the stored operating system; and
  means for connecting said computer device to a secondary memory, wherein said software module of said non-volatile memory is further executable for establishing a connection of said computer device to the secondary memory for retrieving a secondary operating system from the secondary memory and for downloading the secondary operating system from the secondary memory to said random access memory when it is determined that said primary memory device contains an error that prevents the running of the operating system, and wherein said software module of said non-volatile memory further comprises means for maintaining a supply of power to said random access memory during a warm start of the computer device so that the stored contents of said random access memory are not lost during a warm start.

19. The computer device of claim 18, wherein said means for connecting comprises a transceiver, and wherein said central processing unit is connectable to a remote server via said transceiver when it is determined that said permanent memory device contains an error that prevents running of the operating system.

20. The computer device of claim 19, wherein said transceiver comprises one of a dial-up modem, a cable modem, an internet connection, an antenna, and a satellite receiver.

21. The computer device of claim 19, further comprising means for transmitting a characteristic of said computer device to the remote server via said transceiver and said secondary operating system includes parts of the operating system necessary for a primary functionality of said computer device based on the transmitted characteristic.

22. The computer device of claim 21, wherein the secondary operating system further comprises parts of the operating system that support ancillary functions of the computer device based on the transmitted characteristic.

23. The computer device of claim 21, wherein the characteristic comprises one of a model number of said computer device and a memory capacity of said random access memory of said computer device.

24. The computer device of claim 21, further comprising means for transmitting a user profile including user-specific settings for said computer device, wherein the secondary operating system is based on the transmitted characteristic and the transmitted user profile.

25. The computer device of claim 24, wherein the secondary operating system includes parts of the operating system that support a primary functionality of said computer device and parts of the operating system that support an ancillary function of the computer device based on the transmitted characteristic and the transmitted user profile.

26. The computer device of claim 19, further comprising means for transmitting a user profile including user-specific settings for said computer device to the remote server via said transceiver, the secondary operating system corresponding to the transmitted user profile.

27. The method of claim 26, wherein the secondary operating system includes parts of the operating system that support a main functionality of the computer device and parts of the operating system that support an ancillary functions of the computer device based on the transmitted user profile.

28. The computer device of claim 18, wherein said secondary memory comprises one of a floppy disk and an electronic memory.

29. The computer device of claim 18, wherein said secondary memory is located in said computer device.

30. The computer device of claim 18, wherein said secondary operating system comprises only the parts of the operating system that are necessary for a primary functionality of said computer device.

31. A computer device having a system for recovering from a primary memory error that prevents proper start up of a primary operating system, said computer device comprising:
a central processing unit;
a primary memory device connected to said central processing unit and containing a stored operating system for said computer device;
a random access memory connected to said central processing unit and separate from said primary memory device;
a non-volatile memory connected to said central processing unit and storing a software module executable for initializing said computer device during a startup of said computer device and for determining whether said primary memory device contains an operating error that prevents said primary memory device from running the stored operating system; and
means for connecting said computer device to a secondary memory, wherein said software module of said non-volatile memory is further executable for establishing a connection of said computer device to the secondary memory for retrieving a secondary operating system from the secondary memory and for downloading the secondary operating system from the secondary memory to said random access memory when it is determined that said primary memory device contains an error that prevents the running of the operating system, wherein said random access memory defines a portion that is identified by said central processing unit as a virtual disk within which the downloaded secondary operating system is stored.

32. A computer device having a system for recovering from a primary memory error that prevents proper start up of a primary operating system, said computer device comprising:
a central processing unit;
a primary memory device connected to said central processing unit and containing a stored operating system for said computer device;
a random access memory connected to said central processing unit and separate from said primary memory device;
a non-volatile memory connected to said central processing unit and storing a software module executable for initializing said computer device during a startup of said computer device and for determining whether said primary memory device contains an operating error that prevents said primary memory device from running the stored operating system; and
means for connecting said computer device to a secondary memory, wherein said software module of said non-volatile memory is further executable for establishing a connection of said computer device to the secondary memory for retrieving a secondary operating system from the secondary memory and for downloading the secondary operating system from the secondary memory to said random access memory when it is determined that said primary memory device contains an error that prevents the running of the operating system, wherein said computer device comprises a set top box for a television.

33. A computer readable memory storing a software module having computer executable instructions for starting up a computer device with a primary memory device with an operating system stored thereon and a random access memory, the primary memory device being separate from said random access memory, the computer readable memory comprising:
computer executable instructions for determining whether an operating error exists in the primary memory device of the computer device which prevents the running of the operating system of the computer device, in response to an initiation of a startup of the computer device;
computer executable instructions for determining whether the startup is one of a warm start and a cold start, if it is determined that the error exists in the primary memory device of the user;
computer executable instructions for downloading a secondary operating system from a secondary memory and storing the secondary operating system in the random access memory of the computer device if it is determined that the startup is a cold start;
computer executable instructions for initiating a warm start of the computer device after the secondary operating system is saved in the random access memory, wherein a supply of power to the random access memory is maintained during the warm start so that the secondary operating system remains stored on the random access memory during the warm start; and
computer executable instructions for running the secondary operating system on the random access memory of the computer device.

34. The computer readable memory of claim 33, wherein said secondary memory is located in a remote server.

35. The computer readable memory of claim 34, wherein said computer executable steps for downloading the secondary operating system comprise computer executable steps for connecting the computer device to the remote server via a transceiver.

36. The computer readable memory of claim 35, wherein the transceiver comprises one of a dial-up modem, a cable modem, an internet connection, an antenna, and a satellite signal transceiver.

37. The computer readable memory of claim 34, wherein said computer executable steps for downloading the secondary operating system comprise computer executable steps for transmitting a characteristic of said computer device to the remote server via said transceiver.

38. The computer readable memory of claim 37, wherein the characteristic comprises one of a type of the computer device and a memory capacity of the random access memory of the computer device.

39. The computer readable memory of claim 37, wherein said computer executable steps for downloading the secondary operating system comprise computer executable steps for transmitting a user profile of said computer device to the remote server via said transceiver.

40. The computer readable memory of claim 33, wherein said computer executable instructions for determining whether there exists an error that prevents the running of the operating system of the computer device comprises computer executable instructions for one of determining a failure to receive a correct status signal from the primary memory device, determining a failure of a signature check on the primary memory device, and determining an occurrence of at least two repeated resets of a watchdog timer during the startup.

41. The computer readable memory of claim 33, wherein computer executable instructions for determining whether the startup is one of a warm start and a cold start comprises computer executable instructions for determining whether the startup is a cold start by detecting whether a cold start indicating bit in the random access memory is reset.

42. The computer readable memory of claim 33, wherein the secondary memory comprises an external memory medium comprising one of a floppy disk and an electronic memory storage device.

43. The computer readable memory of claim 33, wherein the secondary memory is located in the computer device.

44. The computer readable memory of claim 33, wherein the secondary operating system comprises only the parts of the operating system that are necessary for a primary functionality of the computer device.

45. A computer readable memory storing a software module having computer executable instructions for starting up a computer device with a primary memory device with an operating system stored thereon and a random access memory, the primary memory device being separate from said random access memory, the computer readable memory comprising:

computer executable instructions for determining whether an operating error exists in the primary memory device of the computer device which prevents the running of the operating system of the computer device, in response to an initiation of a startup of the computer device;

computer executable instructions for determining whether the startup is one of a warm start and a cold start, if it is determined that the error exists in the primary memory device of the user;

computer executable instructions for downloading a secondary operating system from a secondary memory and storing the secondary operating system in the random access memory of the computer device if it is determined that the startup is a cold start;

computer executable instructions for defining a portion of the random access memory in which the secondary operating system is stored as a virtual disk; and computer executable instructions for running the secondary operating system on the random access memory of the computer device.

* * * * *